Jan. 5, 1943.  W. F. LARSEN  2,307,518
DYNAMIC DAMPER COUNTERWEIGHT
Filed Oct. 10, 1939
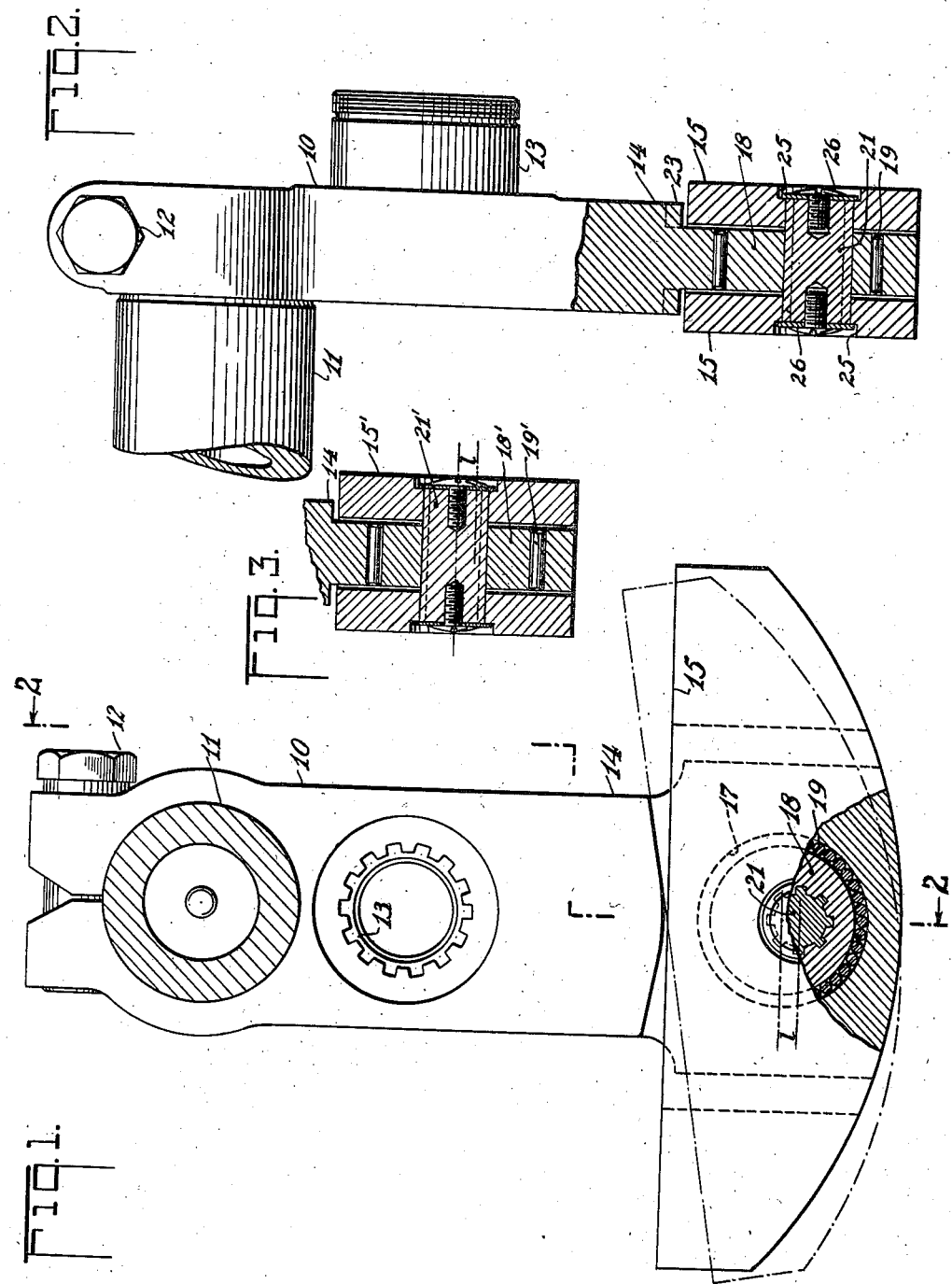
INVENTOR
WALDEMAR F. LARSEN
BY
ATTORNEY Patented Jan. 5, 1943

2,307,518

UNITED STATES PATENT OFFICE 2,307,518

DYNAMIC DAMPER COUNTERWEIGHT

Waldemar F. Larsen, Dover, N. J., assignor to Wright Aeronautical Corporation, a corporation of New York Application October 10, 1939, Serial No. 298,765

5 Claims. (Cl. 74—604)

This invention relates to means for counteracting torsional vibrations in crankshaft systems and comprises in certain aspects improvements over the arrangements shown in Lundquist et al. Patent No. 2,095,757, over Chilton Patent No. 2,112,984, and over Bleecker Patent No. 2,146,524. As in said patents, this invention teaches the use of structure appropriate to a centrifugal pendulum whose frequency varies directly with the rotational speed of the shaft upon which it is mounted. When the shaft is subject to vibrations of a certain number of cycles per revolution under varying rotational speed conditions, it will be appreciated that, if the pendulum is timed to the forcing frequency, it will swing 180° out of phase with the forcing impulses and will act as a torsional counterbalance to damp torsional vibration in the shaft system.

Said prior patents teach primarily pendulum construction adapted for forcing torsional impulses of relatively high order, that is, 4½ impulses per revolution in the case of a nine-cylinder four-cycle aircraft engine. For such frequency orders, it is desirable to utilize a simple pendulum for which the pendulum length to obtain the proper frequency is small—on the order of ⅜ of an inch for a specific practicable crankshaft mechanism. It is found that the crankshaft is subject to other orders of vibration such as half order and first order. For such low frequency, the pendulum length for a simple pendulum would become excessive from a standpoint of design convenience, so that it is an object of this invention to provide a centrifugal pendulum having a short pendulum length which is responsive to low order vibrations. To attain this aim, a compound pendulum is utilized where the pendulum mass, or counterweight mass in the case of an aircraft engine crankshaft, is allowed full polar displacement to the same extent as the polar displacement of the line joining the center of oscillation with the center of gravity of the pendulum mass. The above mentioned Bleecker patent teaches a compromise between simple and compound pendulums; the Chilton patent teaches a purely simple pendulum; and the Lundquist patent teaches a dual purpose pendulum having one phase of operation as a simple pendulum, and the second phase of operation as a modified compound pendulum. This invention distinguishes over the above mentioned teachings by allowing primarily only a definite low order frequency.

The prior art in addition to the patents above mentioned teaches the general principles of centrifugal pendula, so that this invention is concerned largely with a specific pendulum construction adapted for low order vibration response and adapted for embodiment in existing types of aircraft engines where space and weight limitations are definite. In the prior art teachings, other than the specific patents mentioned, little consideration is given to the specific space and weight limitations and the structures thereof are not adapted for aircraft engine use, without the incorporation of new inventive principles as herein outlined.

Objects of the invention in addition to those above enumerated will be appreciated in reading the annexed detailed description in connection with the drawing, in which:

Fig. 1 is an end view partly in section showing the centrifugal pendulum of the invention;

Fig. 2 is a section on the line 2—2 of Fig. 1; and

Fig. 3 is a fragmentary section of an alternative arrangement of said parts.

In the drawing, 10 represents a crankcheek clamped upon a crankpin 11 by a clamp screw 12 in a conventional manner, the boss 13 being coaxial with the center of rotation of the crankshaft and representing a rear portion thereof for support in a suitable bearing. The crankcheek 10 is extended as at 14 to provide a support for a counterweight mass 15 embracing the extension and attached thereto by means next described. The extension 14 has a large bore 17 whose center is located to provide a center of oscillation for the counterweight 15 acting as a pendulum. Within this bore is a plug 18 in bearing engagement with the bore walls through means of an anti-friction needle bearing comprising a plurality of rollers 19. In Figs. 1 and 2, the plug 18 is provided with an eccentric splined bore through which an externally splined pin 21 is passed, the pin projecting on either side of the plug and engaging correspondingly splined openings on the counterweight members 15. In Figs. 1 and 2 the axis of the pin 21 may be assumed as being coincidental with the center of gravity of the counterweights 15 and accordingly, the pendulum length is indicated by the dimension l which is the distance between the center of the plug 18 and the center of the pin 21. This pendulum length for a half-order pendulum in a practicable engine crankshaft is of the order of .20 inch, and it will be seen that a compound pendulum is afforded due to the fact that the counterweights 15 must move with the plug 18 and the pin 21 in a polar sense as indicated by the dotted lines of Fig. 1.

The lower end of the extension 14 may be made thin as shown in Fig. 2 where it is embraced by the counterweights 15, and a shoulder 23 may be formed upon the extension to provide abutments to limit the angular displacement of the counterweights 15 as is obvious in the drawing.

It is not essential that the axis of the pin 21 be eccentric to the axis of the plug 18 for, as shown in Fig. 3, these elements bearing primed reference characters may be concentric. In other words, in Fig. 3 the axis of the pin 21' is coincidental with the axis of the plug 18', and said axis is displaced the distance l from the center of gravity of the counterweight mass which includes the counterweights 15, the pin 21, and the plug 18.

To secure the assembly in position, the counterweights on their exterior surfaces are counterbored as at 25 to provide shoulders flush with the ends of the pin 21, and the counterweights are secured to the pin against axial displacement by means of screws 26. The splines on the pin, in the plug 18 and in the counterweight bores prevent relative rotation between these parts and constrain the assembly to act as a compound pendulum. The use of the large plug 18 embracing the pin 21 permits of adequate bearing with the low degree of friction, while enabling the use of a pin 21 of such size as will be adequate to support the counterweights 15 against the very large centrifugal force developed in the system. This particular arrangement is believed to contribute a constructive improvement in the art, since the conventional method of supporting a compound pendulum by means of a pin spaced from the center of gravity of the pendulum mass is difficult to embody in a practical engine, for the reason that such construction will not permit of adequate material to resist the forces imposed on the system.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. The combination with a crankshaft having a crankcheek extension and a counterweight embracing the extension, of suspension means to support the counterweight as a compound pendulum, said extension having a bore whose axis defines the center of pendulum oscillation, a plug in said bore in bearing engagement with the walls thereof, and a pin passing through the plug and counterweight and non-rotatably engaging both, whereby polar movement of the counterweight is imparted to the plug, said pin comprising the sole means for restraining the counterweight against centrifugal force.

2. In combination with a crankshaft having a crankcheek extension member and a counterweight member, one embracing the other, the embraced member having a large bore therethrough, a plug in said bore in bearing engagement with the walls thereof, and an element passing through and non-rotatably securing the plug to the embracing member, the center of oscillation of said plug being radially inward of the center of gravity of the counterweight member.

3. In combination with a crankshaft having a crankcheek extension member and a counterweight member, one embracing the other, the embraced member having a large bore therethrough, a plug in said bore in bearing engagement with the walls thereof, an element passing through and non-rotatably engaging the plug and the embracing member to secure the embracing member and plug for unitary oscillation with respect to the embraced member, the center of oscillation of said plug being radially inward of the center of gravity of the counterweight member, and the axis of said element being coincident with the axis of oscillation of said plug in its bore.

4. In combination with a crankshaft having a crankcheek extension member and a counterweight member, one embracing the other, the embraced member having a large bore therethrough, a plug in said bore in bearing engagement with the walls thereof, an element passing through and non-rotatably engaging the plug and the embracing member to secure the embracing member and plug for unitary oscillation with respect to the embraced member, the center of oscillation of said plug being radially inward of the center of gravity of the counterweight member, and the axis of said element being eccentric to the axis of oscillation of said plug in its bore.

5. In combination with a crankshaft having a crankcheek extension member and a counterweight member, one embracing the other, the embraced member having a large bore therethrough, a plug in said bore in bearing engagement with the walls thereof, and an element passing through and non-rotatably engaging the plug and the embracing member to secure the embracing member and plug for unitary oscillation with respect to the embraced member, the center of oscillation of said plug being radially inward of the center of gravity of the counterweight member, said element comprising a splined shaft engaging complementary splines in said plug and in said embracing member.

WALDEMAR F. LARSEN.